United States Patent Office 3,520,719
Patented July 14, 1970

3,520,719
INTERCALATION OF KAOLINITE
Norman H. Horton, Tallahassee, Fla., assignor, by mesne assignments, to Engelhard Minerals & Chemicals Corporation, Edison, N.J., a corporation of Delaware
No Drawing. Filed Jan. 13, 1967, Ser. No. 608,967
Int. Cl. D21h 1/22
U.S. Cl. 117—152   1 Claim

ABSTRACT OF THE DISCLOSURE

Paper coated with a white pigment obtained by reacting kaolin clay with a dialkyl sulfoxide and then leaching the sulfoxide from the clay is used for printing with colorless, color-reactant dye material that reacts with the treated clay to produce a colored mark on the paper.

BACKGROUND OF THE INVENTION

Kaolinite can be reacted with cationic crystalline compounds such as urea, ammonium acetate, formamine, hydrazine and/or an alkali salt of acetic acid to form kaolinite intercalation compounds. The process is described in German Pat. No. 1,197,854 issued Aug. 5, 1965, entitled "A Method for Improving the Properties of Kaolin and of Kaolin Containing Clays." In forming these compounds, the urea, hydrazine or other solid, crystalline substance, is diffused into the kaolinite crystals between the layers of the clay crystals. Originally the kaolinite layers are separated a distance of about 7.1 A. After formation of the intercalation compounds, the clay crystals are expanded along the c-axis and are separated a larger distance, depending on the nature of the compound used in preparing the intercalated kaolinite. By washing the aforementioned intercalated compound, the original kaolinite can be regenerated. It has been postulated that the formation of these prior art kaolin intercalation compounds results from hydrogen bonding.

SUMMARY OF THE INVENTION

An object of this invention is the provision of novel kaolinite intercalation compounds.
Another object is to provide a compound capable of gradually releasing lower alkyl sulfoxide.
Another object is to provide a regenerated kaolinite material which possess desirable properties not possessed by the original kaolin material.
Briefly, the novel compound of the present invention is a kaolinite-dimethyl sulfoxide intercalated compound containing equal molal proportions of kaolinite $(Al_2O_3 \cdot 2SiO_2 \cdot 2H_2O)$ and a lower dialkyl sulfoxide, preferably dimethyl sulfoxide.
The compound is formed by reacting kaolinite with at least an equimolal quantity of the lower dialkyl sulfoxide in a nonaqueous reaction medium until the compound is formed. Excess kaolin may be present and may be desirable in some cases.
The intercalated dialkyl sulfoxide compound is an autogenous source of dimethyl sulfoxide when stored in a moist or humid environment.
In accordance with an embodiment of the invention, the kaolinite-sulfoxide intercalated compound finds utility as a source of lower dialkyl sulfoxide when gradual release of the sulfoxide is desired. This gradual release of the sulfoxide is desirable in drug therapy, e.g., in the experimental topical use of dimethyl sulfoxide for its antiflammatory effect.
In accordance with another embodiment of the invention, the intercalated compound is reacted with water, producing an aluminum silicate hydrate chemically similar to kaolinite but modified in crystal habit and properties. This "regenerated kaolinite" is useful as a paper coating and/or filler in manifold printing with carbonless carbon paper, as described in U.S. 3,226,252 to Hemstock et al. When the regenerated kaolinite is put into adsorptive contact with normally colorless, color-reactant dyes, e.g., a mixture of crystal violet lactone and the leuco form of benzoyl methylene blue, an intense blue mark is formed. An advantage of the regenerated kaolinite over adsorptive pigments presently used in the preparation of "carbonless carbon paper" is that the regenerated kaolinite is significantly whiter and brighter. A sheet provided with a surface coating of the regenerated kaolinite is therefore much more attractive in appearance.
The regenerated lower alkyl sulfoxide in the washings can be recovered by evaporating the water. The sulfoxide can then be recycled in preparing new batches of kaolinite-dialkyl sulfoxide compound.
In accordance with still another embodiment of this invention, the lower alkyl sulfoxide can be employed to introduce other compounds to be embedded between the kaolinite plates or layers. This can be done, for example, by displacing the original dialkyl sulfoxide with the other compound(s) after the kaolinite is expanded with the alkyl sulfoxide.
In accordance with still another embodiment of the invention, the lower alkyl sulfoxide is employed to delaminate the kaolinite (separate the layers). This can be accomplished by mechanically working the kaolinite in the presence of lower alkyl sulfoxide. As is known in the art, mechanically delaminated clay is desirable for paper coating purposes when a bright, glossy surface finish is desired.

EXAMPLES OF THE INVENTION

The preferred clay is one composed largely of kaolinite, which is a specific crystalline aluminum silicate hydrate mineral. Kaolin clays containing the usual impurities, e.g., mica, quartz, anatase and ferruginous matter, are useful. Some kaolins contain other clay minerals, such as attapulgite, sepiolite and/or montmorillonite. These impure kaolins can also be employed. Clay that has been beneficiated to remove impurities and has been bleached to improve brightness is especially desirable in carrying out the embodiment of the invention wherein the intercalated kaolinite is washed and the resulting reaction product, referred to herein as "regenerated kaolinite," is used to coat paper.
Lower alkyl sulfoxides encompass the following:

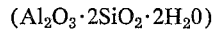

|  | ° C. |
|---|---|
| Dimethyl sulfoxide $(CH_3)_2SO$, M.P. | 8 |
| Diethyl sulfoxide $(C_2H_5)_2SO$, M.P. | 15 |
| Dipropyl sulfoxide $(n—C_3H_7)_2SO$, M.P. | 18 |

Especially preferred because of its availability is dimethyl sulfoxide. Reference is made to the following publication for pertinent descriptive matter "Quarterly Reports on Sulphur Chemistry, an Interpretive Bibliography on the chemistry of Dimethyl Sulfoxide for the Period 1961–1965," published by Intra-Science Research Foundation.
The invention will be more fully understood by the following illustrative examples.
(A) A kaolinite-dimethyl sulfoxide compound was prepared.
The clay employed was commercial, water-washed kaolin supplied to the trade as "ASP 200." The clay was composed largely of high purity kaolinite and had an average particle size of 0.6 micron. A typical chemical analysis of the "ASP" clay is as follows (moisture-free weight basis): $SiO_2$—45.4 percent; $Al_2O_3$—38.8 percent; $Fe_2O_3$—0.3 percent; $TiO_2$—1.5 percent; loss on ignition at 1800° F.—

13.8 percent; others 0.2 percent. The clay is supplied with a maximum free moisture content (determined at about 220° F.) of 1 percent.

The finely divided dry kaolin clay was mixed at room temperature with an equimolal quantity of dimethyl sulfoxide (about 30 percent based on the moisture-free clay weight). The mixture, which had a plastic consistency, was placed in a glass jar, which was tightly sealed. The jar was placed in a 220° F. oven and maintained there for an hour, at which time reaction between the kaolinite and the dimethyl sulfoxide was complete. The product was a dry, white pulverulent substance.

An X ray powder diffraction pattern of the product was obtained and compared with a powder pattern of the starting kaolin clay. The kaolin-dimethyl sulfoxide compound had a characteristic maximum at 8.0° $2\theta$, corresponding to a calculated "$d$" spacing of $11.05\pm0.10$ A. A new peak of moderate intensity appeared at $23.85°2\theta$ ($3.78\pm0.01$ A.) Neither of these peaks is characteristic of kaolinite, indicating that a new compound had been produced. The characteristic kaolinite maxima a $12.4°2\theta$ ("$d$" spacing of 7.16 A.) and $25°$ $2\theta$ ("$d$" spacing of 3.57 A.) were very weak in the pattern of the new product. This showed that most of the kaolinite had reacted.

The significant $d$ values and corresponding intensities of the reflections of kaolinite and kaolinite-dimethyl sulfoxide are summarized below.

X-RAY DIFFRACTION CHARACTERISTICS OF KAOLINITE AND KAOLINITE-DIMETHYL SULFOXIDE (DMSO)

| Kaolinite (DMSO) | | Kaolinite | |
| --- | --- | --- | --- |
| $d$ Spacings, A | Relative line intensity 100 I/Io | $d$ Spacings, A | Relative line intensity 100 I/Io |
| 11.05 | 100 | 7.16 | 100 |
| 7.02 | 3 | 4.46 | 11 |
| 5.54 | 2 | 4.36 | 13 |
| 4.44 | 9 | 4.18 | 11 |
| 4.29 | 6 | 3.845 | 6 |
| 4.17 | 15 | 3.573 | 90 |
| 4.11 | 16 | | |
| 3.97 | 17 | | |
| 3.78 | 30 | | |

Products similar to the sample of kaolinite-dimethyl sulfoxide, described above, were also obtained (1) when the clay was reacted with dimethyl sulfoxide at ambient temperature for a week and (2) when the reactions were carried out with quantities of dimethyl sulfoxide substantially in excess of one mole per mole of kaolinite in the clay. Even with an excess of dialkyl sulfoxide, the reaction took place between equimolal quantities of kaolinite and dialkyl sulfoxide. However, the reaction was hindered when the dimethyl sulfoxide was dissolved in water before being mixed with the clay.

(B) A regenerated, modified kaolinite was obtained by reacting kaolinite-dimethyl sulfoxide with water as follows:

A sample of dimethyl sulfoxide expanded kaolinite from part A. was added to distilled water to form a fluid slurry. The slurry was boiled for 2 hours. After boiling, the liquid was decanted and the solids were washed with several portions of water. The solid residue was white and finely divided, similar to the starting clay in appearance.

An X-ray diffraction pattern of the dried residue was obtained. A comparison of this pattern with the patterns of kaolinite and kaolinite-dimethyl sulfoxide indicated that the residue was different from both the starting clay and the intercalated clay compound. The pattern of the residue did not show the characteristics 11 A. lattice spacing of the kaolinite-dimethyl sulfoxide intercalation compound. While the pattern did show the characteristic peaks of kaolinite, the 110 peak ("$d$" spacing at 7.16 A.) was broadened and not so intense as the peak for kaolinite. Similarly, the peak at "$d$"=3.57 A. was broader and not distinct. These changes in the pattern indicate that the residue was a less well-ordered (more amorphous) form of kaolinite.

(C) To compare the reactivity of kaolinite with the regenerated kaolinite, a sample of the washed residue from part B. (regenerated, amorphous kaolinite), was coated on a piece of paper. Another sheet of the paper was coated in similar manner with a sample of the "ASP 200" clay. Each coated sheet was placed in face-to-face relationship with commercial sheet of "NCR" paper containing an encapsulated mixture of crystal violet lactone and benzoyl leuco methylene blue. When writing pressure was applied to the assembly containing the kaolin coated sheet, a weak blue mark was produced where the kaolin was put into adsorptive contact with the dyestuff liberated by the writing pressure. In contrast, a very intense blue mark was produced with the assembly containing the regenerated kaolinite as the coating pigment.

Thus, it has been shown that kaolinite reacts with dimethyl sulfoxide to form a new crystalline compound from which the dimethyl sulfoxide can be displaced by reaction with water to prepare a novel poorly ordered form of kaolinite which is especially useful as an aborbent pigment for printing with leuco dyes.

All X-ray powder diffraction patterns referred to herein were obtained by standard techniques using a copper doublet as the source of K$\alpha$ X-radiation, a Norelco sample holder having a sample area of 0.812" x 0.408", an X-ray diffractometer with a scintillation counter and a strip chart pen recorded. The patterns were obtained with a receiving slit width of 0.006", a 3° take-off angle, a scanning rate of $2°2\theta$ per minute and a time constant of 2 seconds. Scanning direction was from 2° to 90°. The relative intensity of the peaks ($100I/Io$) and the interplanar spacing ("$d$" values) were calculated in conventional manner from the peak heights and positions recorded on the strip chart.

I claim:

1 As a new article of manufacture paper provided with a white coating consisting essentially of a pigment which is a white finely divided hydrated aluminum silicate of the empirical formula $Al_2O_3 \cdot 2SiO_2 \cdot 2H_2O$ and obtained by reacting kaolinite with a lower dialkyl sulfoxide containing from 1 to 3 carbon atoms in the alkyl group and then reacting the resulting crystalline kaolinite-lower dialkyl sulfoxide compound with water said coating on said paper being capable of producing a dark blue mark when placed into adsorptive contact with an oily solution of a mixture of crystal violet lactone and benzoyl leuco methylene blue, and said hydrated aluminum silicate being the sole pigment coated on the paper which is capable of producing said dark blue mark when placed in adsorptive contact with said solution of dyes.

References Cited

UNITED STATES PATENTS

| | | | |
| --- | --- | --- | --- |
| 3,014,836 | 12/1961 | Proctor | 117—152 X |
| 3,085,894 | 4/1963 | Rowland | 117—152 X |
| 3,218,182 | 11/1965 | Hemstock et al. | 106—72 X |
| 3,223,546 | 12/1965 | Hemstock | 106—72 X |
| 3,224,892 | 12/1965 | Hemstock | 117—36.2 X |
| 3,226,252 | 12/1965 | Hemstock | 117—155 |
| 3,301,691 | 1/1967 | Hemstock et al. | 106—72 |
| 3,309,211 | 3/1967 | Weiss et al. | 106—72 |
| 3,309,214 | 3/1967 | Podschus et al. | 106—72 X |
| 3,318,718 | 5/1967 | Beamesderfer et al. | 117—152 X |

WILLIAM D. MARTIN, Primary Examiner

M. R. LUSIGNAN, Assistant Examiner

U.S. Cl. X.R.

117—36.2; 106—72, 288